(12) United States Patent
Gionta

(10) Patent No.: US 10,471,585 B1
(45) Date of Patent: Nov. 12, 2019

(54) WET BOX WORK STATION

(71) Applicant: Jesse Gionta, Wappingers Falls, NY (US)

(72) Inventor: Jesse Gionta, Wappingers Falls, NY (US)

(*) Notice: Subject to any disclaimer, the term of this patent is extended or adjusted under 35 U.S.C. 154(b) by 0 days.

(21) Appl. No.: 16/204,026

(22) Filed: Nov. 29, 2018

(51) Int. Cl.
| | |
|---|---|
| *B24D 7/02* | (2006.01) |
| *B25H 1/20* | (2006.01) |
| *B25H 1/04* | (2006.01) |
| *B28D 7/02* | (2006.01) |
| *B08B 15/02* | (2006.01) |
| *B23D 59/00* | (2006.01) |

(52) U.S. Cl.
CPC ............ *B25H 1/20* (2013.01); *B25H 1/04* (2013.01); *B08B 15/02* (2013.01); *B23D 59/006* (2013.01); *B28D 7/02* (2013.01)

(58) Field of Classification Search
CPC .. B25H 1/20; B25H 1/04; B08B 15/02; B23D 59/006; B28D 7/02
USPC ........................................................ 125/12
See application file for complete search history.

(56) References Cited

U.S. PATENT DOCUMENTS

| | | | | | |
|---|---|---|---|---|---|
| 2,999,448 | A * | 9/1961 | Abler | ..................... | B25H 1/20 454/60 |
| 3,090,615 | A * | 5/1963 | May | ..................... | B27B 27/02 125/12 |
| 3,284,148 | A * | 11/1966 | Ramniceanu | ............ | B25H 1/20 312/209 |
| 4,179,984 | A * | 12/1979 | Gorcey | ..................... | B25H 1/20 422/536 |
| 4,423,568 | A * | 1/1984 | Gould | ..................... | B24B 55/06 144/251.2 |
| 4,779,603 | A * | 10/1988 | Crocetti | ................. | B23D 59/02 125/13.01 |
| 5,172,680 | A * | 12/1992 | Swan | ..................... | B23D 59/006 125/12 |
| 5,577,955 | A * | 11/1996 | Voege | ..................... | B23D 59/02 451/451 |
| 5,741,175 | A * | 4/1998 | Voege | ..................... | B23D 59/02 451/451 |
| 6,257,222 | B1 * | 7/2001 | Kaeser | ................... | B23Q 11/08 125/12 |
| 6,557,602 | B1 * | 5/2003 | Sorensen | ............. | B23D 47/025 144/286.1 |
| 6,796,890 | B1 * | 9/2004 | Goldrick | .............. | B23D 59/006 125/12 |

(Continued)

FOREIGN PATENT DOCUMENTS

DE    102016115883 A1 *  3/2018  ................ B01L 1/00

*Primary Examiner* — George B Nguyen
(74) *Attorney, Agent, or Firm* — Saile Ackerman LLC; Stephen B. Ackerman; Rosemary L. S. Pike

(57) ABSTRACT

An enclosure for using a tile saw is described. The enclosure comprises a rectangular tray having a front, a rear, and two side walls and a bottom surface wherein the bottom surface is inclined from a first height adjacent to the front wall to a second height adjacent to the rear wall wherein the second height is lower with respect to top surfaces of the front, rear, and side walls than the first height wherein the tray is configured to have a tile saw used therein. Two side panels, a rear panel, and a top panel are configured to be joined together to form a waterproof box on three sides and top of the tray so that water used to cool a tile saw blade is not sprayed outside of the waterproof box.

20 Claims, 5 Drawing Sheets

(56) References Cited

U.S. PATENT DOCUMENTS

| | | | | |
|---|---|---|---|---|
| 8,215,296 B1* | 7/2012 | Cisneros | ............... | B28D 7/04 |
| | | | | 108/28 |
| 9,285,132 B2* | 3/2016 | Waulters | ............... | F24F 7/007 |
| 9,844,306 B1* | 12/2017 | Fitzpatrick | ............ | B08B 15/00 |
| 2016/0325365 A1* | 11/2016 | Jones | ............... | B23D 59/025 |

* cited by examiner

WET BOX WORK STATION

TECHNICAL FIELD

The disclosure relates to tile cutting, and more particularly, to a wet box work station that will improve the tile cutting process.

BACKGROUND

Ceramic or porcelain tile is used as flooring or on walls or counters in residences and businesses. When installing tile, the installer must cut at least some of the tiles to fit the desired layout pattern. Wet saws are power tools that use a water-cooled diamond blade for cutting tile. Water helps the saw blade to cut cooler, faster, and longer. The usual practice is to cut tile outdoors since the process is messy because of sprayed water. This requires the installer constantly to move between outside and inside during installation. Cold, hot, or inclement weather of any kind results in more of a problem with this method.

Several U.S. patents show tables or covers for tile saws, including U.S. Pat. No. 9,285,132 (Waulters), U.S. Pat. No. 8,215,296 (Cisneros), U.S. Pat. No. 6,557,602 (Sorenson et al), U.S. Pat. No. 5,557,955 (Voege), and U.S. Pat. No. 4,779,603 (Crocetti).

SUMMARY

A principal object of the present disclosure is to provide an enclosure for operating a tile saw wherein water is prevented from spraying outside the enclosure.

Another object of the present disclosure is to provide an enclosure for operating a tile saw wherein water is prevented from spraying outside the enclosure so that tile can be cut in an interior setting.

A further object of the disclosure is to provide a wet box for a tile saw that can be used in an interior setting wherein removable legs allow the wet box to be set either on the legs or on a surface.

Yet another object is to provide a wet box for a tile saw wherein the wet box has a drain hole configured to receive a plug or a standard hose fitting.

In accordance with the objects of the disclosure, an enclosure for using a tile saw is achieved. The enclosure comprises a rectangular tray having a front, a rear, and two side walls and a bottom surface wherein the bottom surface is inclined from a first height adjacent to the front wall to a second height adjacent to the rear wall wherein the second height is lower with respect to top surfaces of the front, rear, and side walls than the first height wherein the tray is configured to have a tile saw used therein. Two side panels, a rear panel, and a top panel are configured to be joined together to form a waterproof box on three sides and top of the tray so that water used to cool a tile saw blade is not sprayed outside of the waterproof box.

Also in accordance with the objects of the disclosure, a method for cutting tile is achieved. An enclosure is provided comprising a rectangular tray having a front, a rear, and two side walls and a bottom surface wherein the bottom surface is inclined from a first height adjacent to the front wall to a second height adjacent to the rear wall wherein the second height is lower with respect to top surfaces of the front, rear, and side walls than the first height. Two side panels, a rear panel, and a top panel are configured to be joined together to form a waterproof box on three sides and top of the tray. Tile is cut using a tile wet saw within the enclosure wherein water spray from the tile wet saw remains within the enclosure.

Also in accordance with the objects of the disclosure, a method for cutting tile is achieved. An enclosure is provided comprising a rectangular tray having a front, a rear, and two side walls and a bottom surface wherein the bottom surface is inclined from a first height adjacent to the front wall to a second height adjacent to the rear wall wherein the second height is lower with respect to top surfaces of the front, rear, and side walls than the first height and a first lip extending an entire length of the rear and side walls along an outside surface of the rear and side walls and at least one first slot in a top surface of the walls abutting the first lip. Two side panels comprise at least one tab on a bottom edge of each of the side panels, a second lip on a rear edge of each of the side panels, at least one second slot on the second lip, the second slot having a round portion and a vertical slot portion under and connected with the round portion; and at least one third slot on top edges of each of the side panels wherein the third slots each have a first vertical component extending from the top edge of the side panel downward to a first end of a horizontal component and a second vertical component extending downward from a second end of the horizontal component.

A rear panel comprises at least one tab on a bottom edge thereof and at least one first button on each side of a front surface of the rear panel aligned with each second slot. A top panel comprises a third lip extending around three sides of the top panel and at least one second button on an inside of the third lip adjacent to each of the side panels. At least one tab of each of the two side panels is inserted into the side wall first slots. Thereafter, at least one second button on each side of the rear panel is inserted into the round portion of the second slot on the second lip and the buttons are slid down the vertical slot while the at least one tab on the bottom edge of the rear panel is inserted into the first slot in the rear wall thereby locking in place the side and rear panels. The top panel is placed on top of the locked in place side and rear panels wherein the third lip abuts outside surfaces of the side and rear panels. The at least one second button on the inside of the third lip adjacent to each of the side panels is slid into the first vertical slot, then along the horizontal slot, and finally into the second vertical slot to lock the top panel into place, thereby providing a waterproof box. Tile is cut using a tile wet saw inside the enclosure wherein water used to cool a blade of the tile wet saw is not sprayed outside of the waterproof box.

BRIEF DESCRIPTION OF THE DRAWINGS

In the accompanying drawings forming a material part of this description, there is shown.

DETAILED DESCRIPTION

The present disclosure describes an enclosure or box for cutting tile, for example, ceramic or porcelain tile such as used in kitchens or bathrooms, using a wet saw. Additionally, other materials can be cut using the wet box of the present disclosure, including marble, stone, and brick, for example. The box is waterproof and used to contain the tile wet saw and to avoid unwanted water spray from leaving the box.

Figure 1:
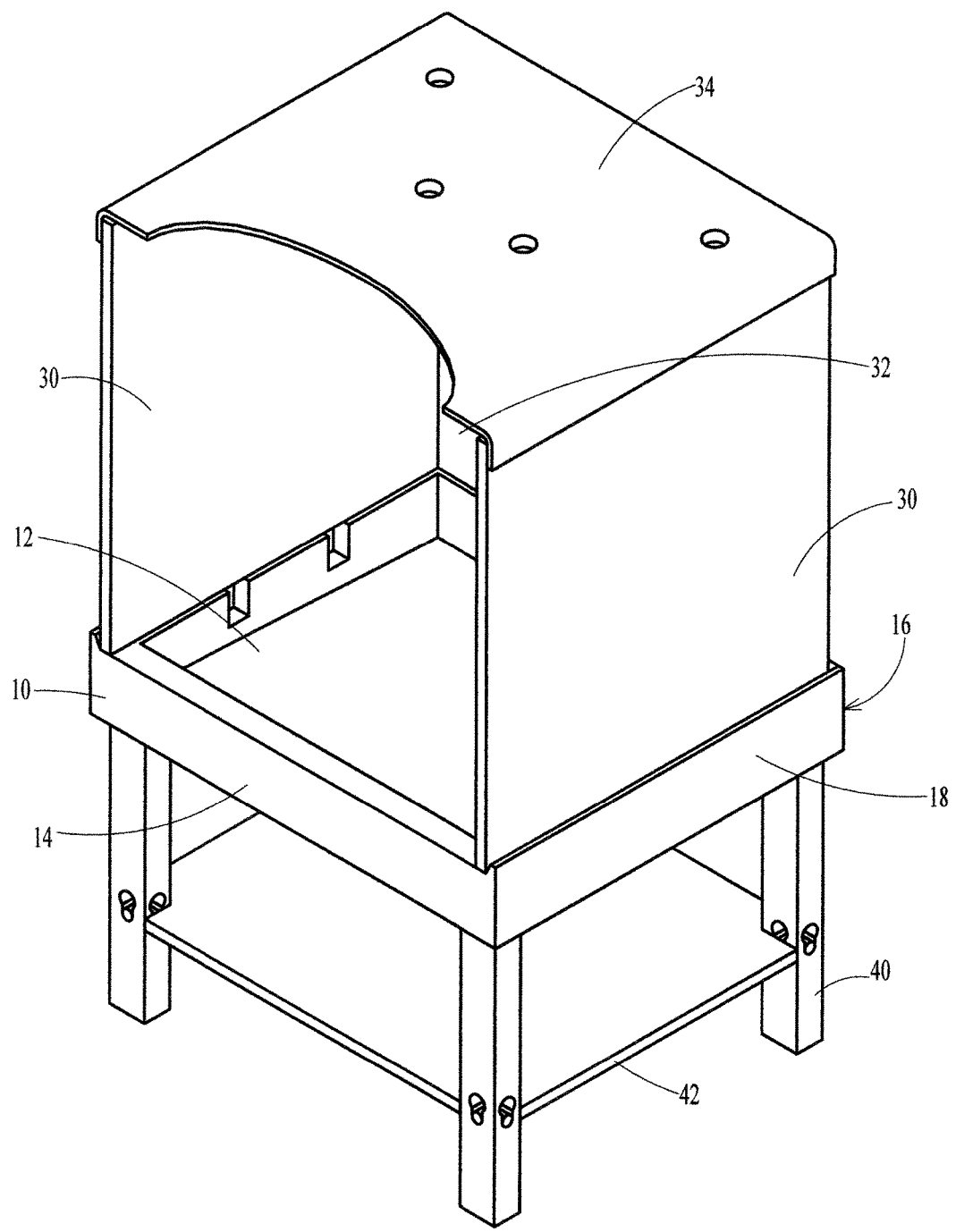
FIG. 1 is an isometric view of a preferred embodiment of the present disclosure.

Referring now to the drawing figures, the wet box of the present disclosure will be described in detail. FIG. 1 illustrates a preferred embodiment of the wet box of the present disclosure. Tray 10 is preferably constructed of one piece of molded plastic. The front 14, rear 16, and side 18 portions of the tray 10 are level; that is, they are on a same plane. The floor 12 of the tray is pitched so that it angles from a high point at the front 14 of the box at which the tile saw user will be standing to a low point at the rear 16 of the box. For example, a height difference between the front 14 height of the floor 12 and the rear 16 height of the floor 12 is between about 1.5 and 3 inches, and preferably about 2". A wet saw will be rested on the front panel 14.

Two side panels 30, rear panel 32, and top panel 34 connect together to form three-sided protection from water spray when the tile saw is in use. These four panels will snap, slide, and/or lock together. Removable legs 40 and bottom shelf 42 are also shown.

Figure 2:
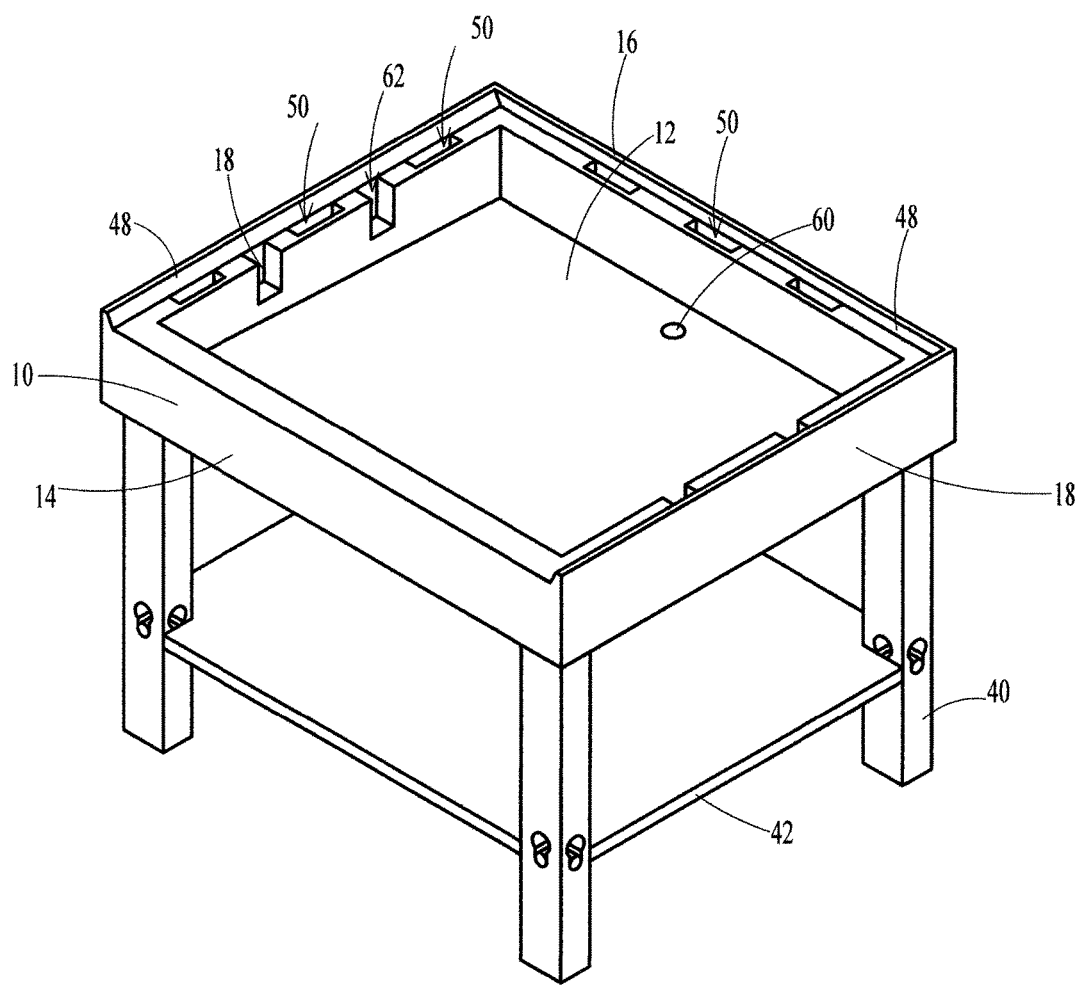
FIG. 2 is an isometric view of a portion of the preferred embodiment of the present disclosure.

FIG. 2 illustrates the wet box with side, rear, and top panels removed. Lip 48 extends above the side and rear walls 18 and 16 of the tray 10. Slots 50 can be seen formed in a portion of the side and rear walls abutting the lip.

Also visible in FIG. 2 is drain hole 60. The drain hole is threaded to accept a standard garden hose or washing machine hose, for example, for the purpose of draining or cleaning the tray. For example, a hose can be threaded into the drain hole so that any water in the tray will drain out through the hose, perhaps into a bucket placed on the shelf 42, or into a drain near the wet box. Water could drain directly into a bucket or container below the tray through the drain hole without the use of a hose. Alternately, the drain hole can be plugged so that water does not drain out of the tray. A plug can be threaded or inserted snugly into the drain hole. Often, excess spray is minimal and can be sponged up from the tray rather than needing a hose and bucket.

Figure 3:
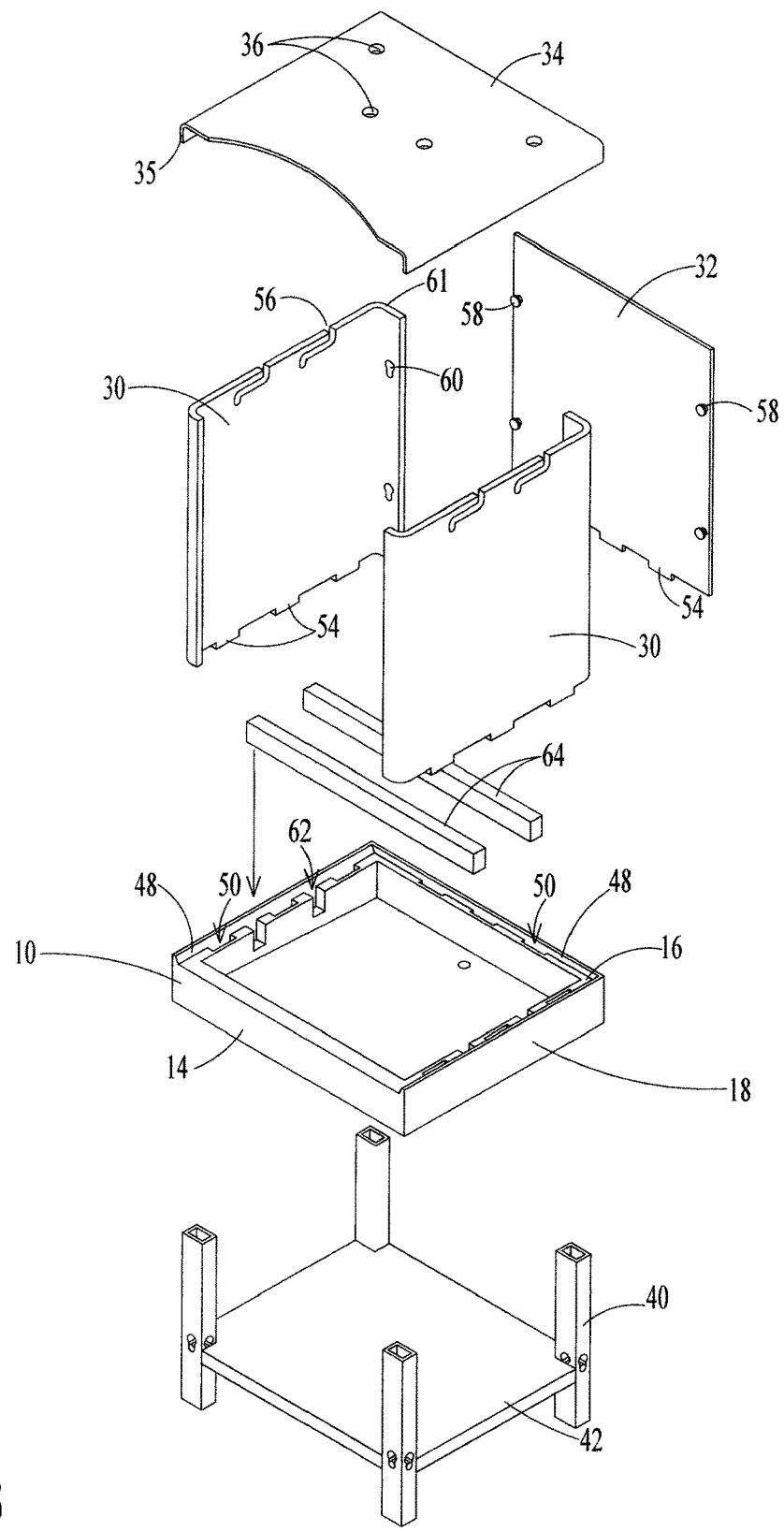
FIG. 3 is an exploded view of the preferred embodiment of the present disclosure.

FIG. 3 is an exploded view of one embodiment of the wet box of the present disclosure showing parts of the wet box that can be disassembled by a user of the box. Side and rear panels, 30 and 32, respectively, have tabs 54 on their bottom edges that fit into slots 50 on the tray, shown in FIG. 2. The lip 48 abuts the outside surface of the side and rear panels when they are installed.

Each side panel 30 has a lip 61 on the rear edge of the panel. At least one slot 60 is on the lip having a round portion and a vertical slot portion under and connected with the round portion. At least one button is on each side of the rear surface of the rear panel 32 aligned with each slot 60. Note that the rear surface of the rear panel is shown in FIG. 3. When it is installed, it will be flipped around.

After the two side panels have been installed in the slots 50, buttons 58 on the outside surface of the rear panel 32 are inserted into the round portion of slot 60 on lip 61 at the rear edge of the side panels 30. As the rear panel is slid into the rear slot 50, the buttons 58 slide down the vertical slot. The side and rear panels are thus locked in place in a watertight configuration with the rear panel to the inside of the lip 61, as shown in FIG. 4.

Figure 4:
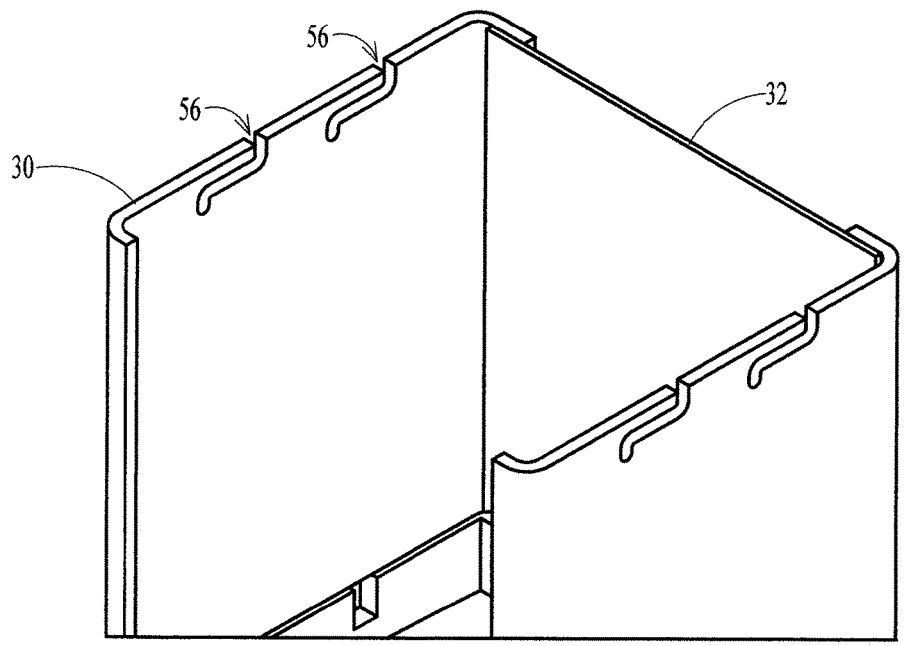
FIG. 4 is an enlarged isometric view showing top edges of side portions of the preferred embodiment of the present disclosure.
Figure 5:
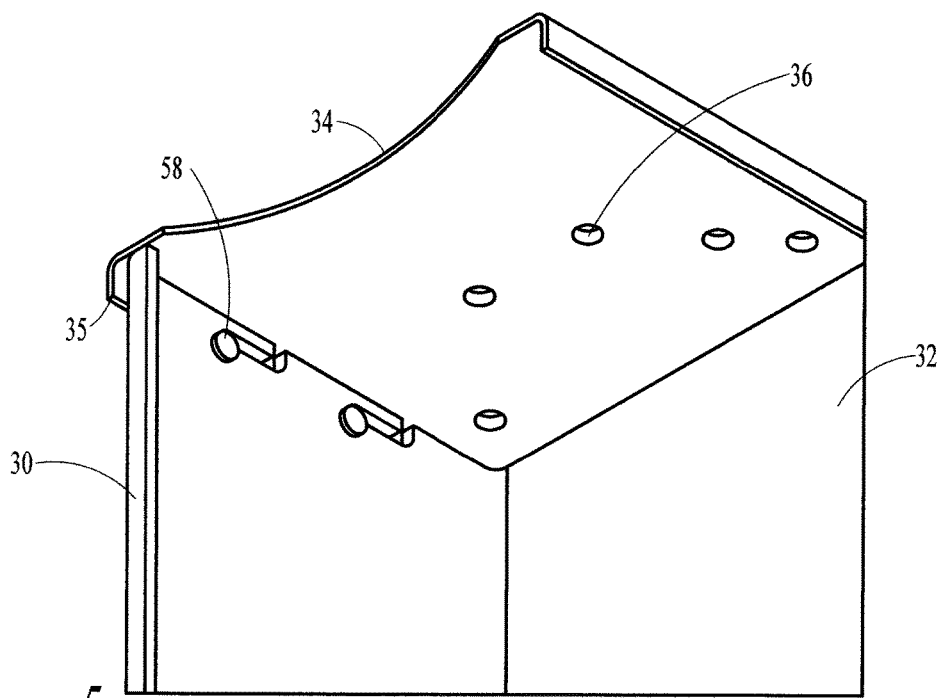
FIG. 5 is an enlarged isometric view showing the underside of a top portion of the preferred embodiment of the present disclosure.

FIGS. 4 and 5 illustrate how the top panel 34 locks onto the side and rear panels 30 and 32, respectively. FIG. 4 illustrates slots 56 on the top edges of the side panels 30. The slots each have a first vertical component extending from the top edge of the side panel downward to a first end of a horizontal component and a second vertical component extending downward from a second end of the horizontal component. As shown in FIG. 5, the top panel 34 has a lip 35 extending around three sides of the panel that, when the top panel is placed on top of the installed side and rear panels, abuts the outside surface of the side and rear panels. At least one button 58 on the inside of the lip adjacent to the side panels slides into the first vertical slot, then along the horizontal slot, and into the second vertical slot to lock the top panel into place, providing a waterproof seal.

The wet box can be used with the legs 40 in place under the tray 10. Preferably, four legs 40 supported by shelf 42 fit into indentations in the four corners of the underside of the tray 10. The legs are removable, however, so that the tray can be placed in alternate locations, such as on a kitchen or bathroom countertop or straddling a bathtub edge in a bathroom. Optionally, instead of shelf 42, there may be a frame connecting each of legs 40 to adjacent legs.

Holes 36 on the top surface of the top panel 34 can be used for passing through the electrical cord of the wet saw or allowing for a drop light to be added, for example.

Figure 6:
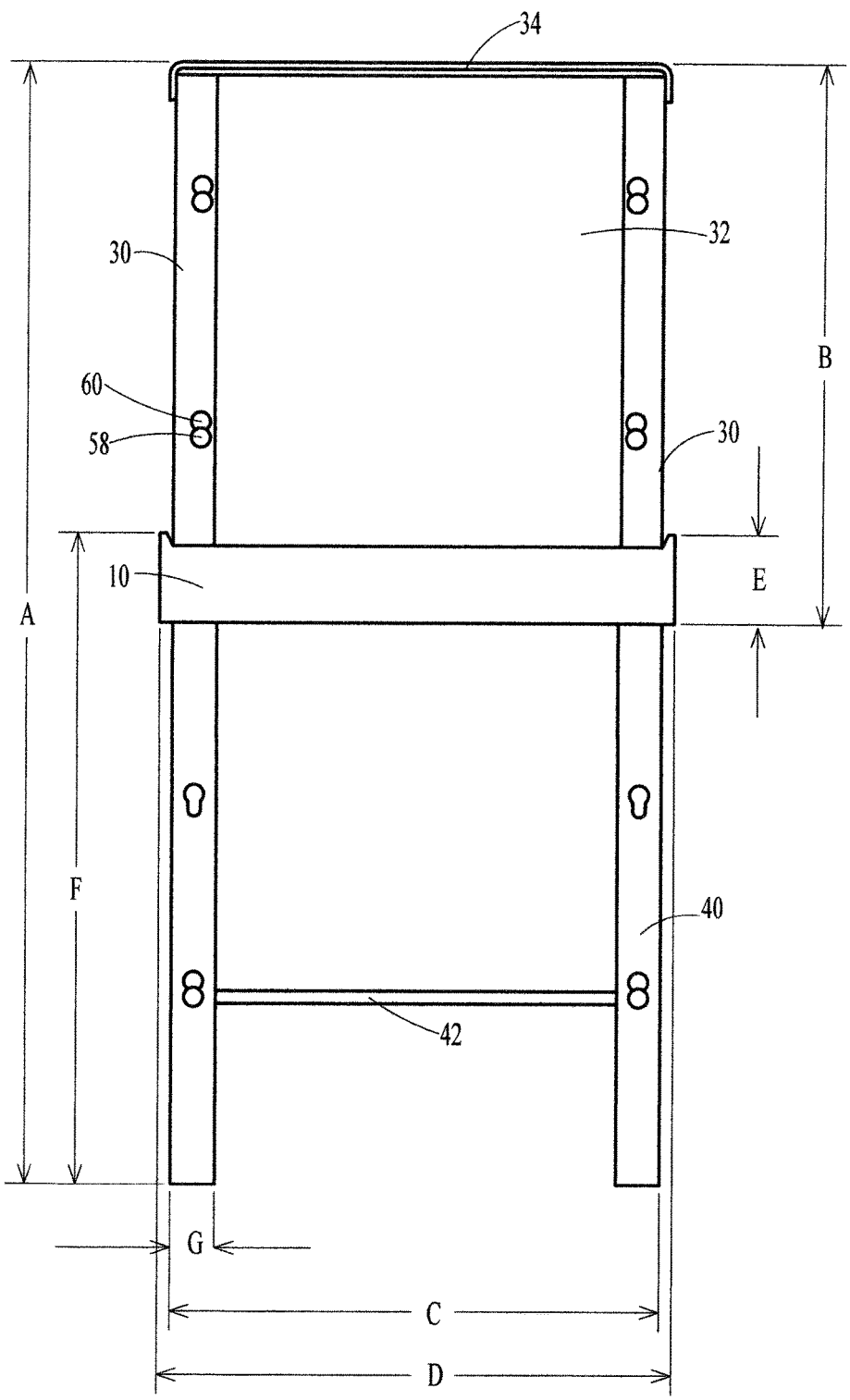
FIG. 6 is a rear view of the preferred embodiment of the present disclosure

FIG. 6 illustrates a rear view of the wet box of the present disclosure. For example, the total height A of the wet box including the legs and protective panels is between about 55" and 75" and preferably about 64 inches. Height B is the measurement of the bottom of the tray 10 to the top of the top panel 34. This is between about 36" and 50" and preferably about 40 inches. The side-to-side measurement C of the outside surfaces of the legs 40 is between about 31 and 37 inches. The side-to-side measurement D of the tray 10 is between about 34 and 40 inches. The height E of the tray walls is between about 4" and 7" and preferably about 6 inches. The height F from the floor to the top of the tray walls when the tray is on the legs is between about 28" and 36" and preferably about 30 inches. The thickness of the legs 40 is between about 2 and 3 inches.

A narrower wet box can be advantageous for cutting smaller tiles while a wider wet box can cut larger tiles. As shown in FIG. 3, unique dual rail supports are incorporated inside the wet box. The rails 64 are preferably made to the dimensions of standard 2×3 lumber. The rails are the length of the inside horizontal measurement of the tray 10 and slide into slots 62 in the tray sides 16. The rails 64 provide a stable surface for the wet saw and make it easier to slide the wet saw side-to-side and front-to-back. The wet saw can also be slid partially out of the box on the rails to allow for long rip cuts of long tile. The wet saw can even be set up diagonally on the rails to allow for making occasional crosscuts of long tile or marble saddles by allowing the tile to hang out of the box. The rails also allow for differences in the outer dimensions of the wet saw as there are variations in size according to the style and manufacturer of the wet saw.

The enclosure provides a complete work station for a user. The tray 10 provides a very convenient shelf. Side areas of the tray may be used as a wet space for storing still wet tile pieces for later use. The wet box work station effectively contains water used to cool the tile saw blade within the enclosure and prevents water spraying out of the enclosure during use of a wet saw. Thus, a user may use the work station of the present disclosure in an indoor setting; for example, in an upper floor of an apartment building, or in poor weather, without fear of damaging an indoor area.

The wet box of the present disclosure can be used for a variety of different wet saw sizes and for cutting a variety of tile sizes. The wet box includes side, rear, and top panels that can be joined together to form a waterproof box on three sides and top of the tray so that water used to cool the saw blade is not sprayed outside of the box. This allows a tile installer to cut tile indoors without worrying about the mess. The wet box can be used on its legs or the tray may be placed directly on a countertop, for example.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. An enclosure for using a tile saw comprising:
 a rectangular tray having a front, a rear, and two side walls and a bottom surface wherein said bottom surface is inclined from a first height adjacent to said front wall to a second height away from said front wall wherein said second height is lower with respect to top surfaces of said front, rear, and side walls than said first height wherein said tray is configured to have a tile saw used therein; and
 two side panels, a rear panel, and a top panel configured to be joined together to form a waterproof box on three sides and top of said tray so that water used to cool a tile saw blade is not sprayed outside of said waterproof box; and
 at least two rails in said tray, configured to facilitate sliding a tile saw from one side of said tray to another side of said tray, from front to back of the tray, or diagonally on said rails.

2. The enclosure according to claim 1 wherein said tray comprises a single piece of molded plastic.

3. The enclosure according to claim 1 wherein said rear and side walls further comprise a first lip extending an entire length of said rear and side walls along an outside surface of said rear and side walls and at least one first slot in a top surface of said walls abutting said first lip wherein said first slot is configured to receive said rear and side panels, respectively.

4. The enclosure according to claim 3 further comprising at least one tab on a bottom edge of each of said rear and side panels wherein said at least one tab is configured to slide into said rear and side slots, respectively.

5. The enclosure according to claim 1 further comprising a drain hole in said bottom surface of said tray adjacent to said rear wall.

6. The enclosure according to claim 5 wherein said drain hole is configured to receive:
 a hose threaded therein to allow drainage of water through said drain hole; or
 a drain plug threaded or snugly inserted therein to prevent drainage of water through said drain hole.

7. The enclosure according to claim 1 further comprising removable legs configured to support said tray thereon.

8. The enclosure according to claim 3 further comprising:
 a second lip on a rear edge of each of said side panels;
 at least one second slot on said second lip, said second slot having a round portion and a vertical slot portion under and connected with said round portion; and
 at least one first button on each side of a rear surface of said rear panel aligned with each said second slot;
 wherein said at least one first button on each side of said rear surface of said rear panel is configured to be inserted into said round portion of said second slot on said second lip and slid down said vertical slot thereby locking in place said side and rear panels wherein said second lip abuts said rear surface of said rear panel.

9. The enclosure according to claim 8 further comprising:
 at least one third slot on top edges of each of said side panels wherein said third slots each have a first vertical component extending from said top edge of said side panel downward to a first end of a horizontal component and a second vertical component extending downward from a second end of said horizontal component;
 a third lip extending around three sides of said top panel wherein when said top panel is placed on top of locked in place said side and rear panels, said third lip abuts outside surfaces of said side and rear panels; and
 at least one second button on an inside of said third lip adjacent to each of said side panels;
 wherein said at least one second button is configured to slide into said first vertical slot, then along said horizontal slot, and finally into said second vertical slot to lock said top panel into place, thereby providing a waterproof seal.

10. The enclosure according to claim 1 wherein said at least two rails each have two ends configured to slide into fourth slots extending vertically downward from top edges of each of said side walls of said tray.

11. A method for cutting tile comprising:
 providing an enclosed work station comprising:
  a rectangular tray having a front, a rear, and two side walls and a bottom surface wherein said bottom surface is inclined from a first height adjacent to said front wall to a second height away from said front wall wherein said second height is lower with respect to top surfaces of said front, rear, and side walls than said first height; and
  two side panels, a rear panel, and a top panel configured to be joined together to form a waterproof box on three sides and top of said tray; and
  at least two rails in said tray, configured to facilitate sliding a tile saw from one side of said tray to another side of said tray, from front to back of the tray, or diagonally on said rails; and
 cutting tile using a tile wet saw within said enclosed work station wherein water spray from said tile wet saw remains within said enclosed work station.

12. The method according to claim 11 wherein said tray comprises a single piece of molded plastic.

13. The method according to claim 11 wherein said tray further comprises a drain hole in said bottom surface of said tray adjacent to said rear wall and wherein said method further comprises:
 threading a hose into said drain hole to allow drainage of water through said drain hole; or
 placing a container underneath said drain hole to allow drainage of water through said drain hole into said container, or
 threading or snugly inserting a drain plug into said drain hole to prevent drainage of water through said drain hole.

14. The method according to claim 11 further comprising:
 adding removable legs at four corners of said tray to support said tray thereon; or removing said removable legs from said four corners of said tray to support said tray on a surface.

15. The method according to claim 11 further comprising: inserting each end of said at least two rails into slots extending vertically downward from top edges of each of said side walls of said tray.

16. A method for preparing a waterproof enclosure for cutting tile comprising:
   providing an enclosure comprising:
      a rectangular tray having a front, a rear, and two side walls and a bottom surface wherein said bottom surface is inclined from a first height adjacent to said front wall to a second height away from said front wall wherein said second height is lower with respect to top surfaces of said front, rear, and side walls than said first height and a lip extending an entire length of said rear and side walls along a top surface of said rear and side walls;
      two side panels,
         a rear panel, and
         a top panel, each of said side panels, rear panel, and top panel being configured to snap, slide, or lock together;
   locking each of said two side panels onto said lip of said side walls of said tray,
   thereafter locking said rear panel to said lip of said rear wall of said tray and locking in place said side panels to said rear panel;
   placing said top panel on top of locked in place said side and rear panels and
sliding, snapping, or locking said top panel onto said side panels and said rear panel, thereby providing a waterproof box; and
cutting tile using a tile wet saw inside said enclosure wherein water used to cool a blade of said tile wet saw is not sprayed outside of said waterproof box.

17. The method according to claim 16 wherein said tray further comprises a drain hole in said bottom surface of said tray adjacent to said rear wall and wherein said method further comprises:
   threading a hose into said drain hole to allow drainage of water through said drain hole; or
   placing a container underneath said drain hole to allow drainage of water through said drain hole into said container, or
   threading or snugly inserting a drain plug into said drain hole to prevent drainage of water through said drain hole.

18. The method according to claim 16 further comprising:
   adding removable legs at four corners of said tray to support said tray thereon; or
   removing said removable legs from said four corners of said tray to support said tray on a surface.

19. The method according to claim 16 further comprising: inserting each end of at least two rails into slots extending vertically downward from top edges of each of said side walls of said tray wherein said at least two rails are configured to support a variety of tile wet saw sizes and to facilitate sliding said tile wet saw from one side of said tray to another side of said tray, from front to back of the tray, or diagonally on said rails.

20. The enclosure according to claim 7 further comprising a shelf under said tray supporting said removable legs.

* * * * *